Figure 1:
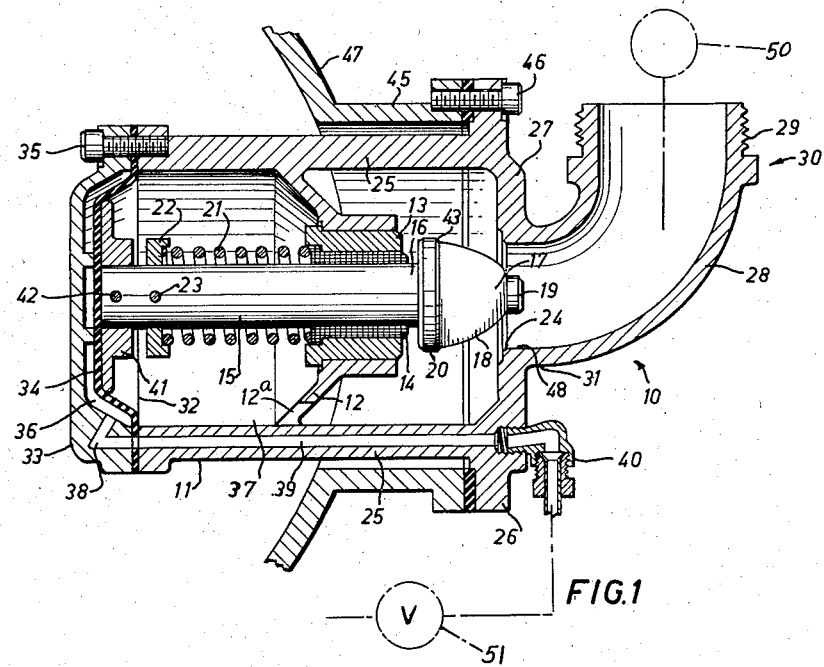

April 14, 1959 L. F. GIAUQUE 2,882,008
PNEUMATIC VALVE CONSTRUCTION
Filed July 6, 1955

Inventor
LOUIS F. GIAUQUE
by: Maybee & Legris
Attorneys

United States Patent Office 2,882,008
Patented Apr. 14, 1959

2,882,008
PNEUMATIC VALVE CONSTRUCTION
Louis F. Giauque, Kapuskasing, Ontario, Canada
Application July 6, 1955, Serial No. 520,241
1 Claim. (Cl. 251—61)

This invention relates generally to fluid flow apparatus embodying remote control actuating means therefor.

In the paper making arts, an air cooling system is employed in which the air pressure manifold or header is disposed adjacent the calender and carries a plurality of valves in association therewith controlling the direction of cooling air to the calender. The valve body and included actuating mechanism are exposed and physically project into already crowded working space.

It is the main object of the present invention to provide a fluid valve for application preferably to a header of a calender cooling system wherein the body of the valve is sealed substantially within the header. It is another object to provide, in such a valve, elements adapted for remote control.

Other objects of the invention will be appreciated by a study of the following specification taken in conjunction with the accompanying drawings.

Figure 2:
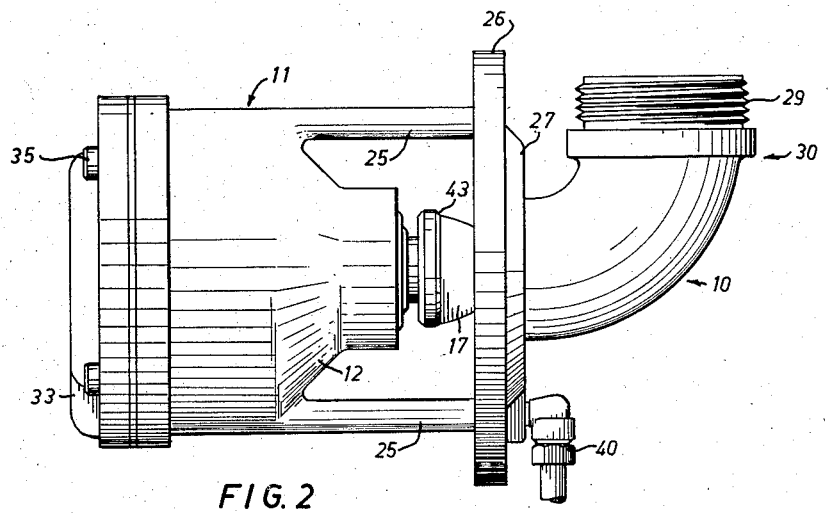

In the drawings:

Figure 1 is a sectional view of a valve construction according to the invention applied to a conduit or header; and Figure 2 is an exterior elevation of the valve of Figure 1.

Referring to the drawings, the valve 10 of the invention comprises a body casting 11 having converging side walls 12 supporting a sleeve or bushing 13 and an inner self-lubricating sleeve or bushing 14 adapted to guide the valve rod or stem 15 therethrough. The outer end 16 of valve rod 15 supports a valve member or plug 17 having an outer surface 18 which diverges from the tip portion 19 of relatively small diameter to the valve lip or rim 20.

The valve rod 15 is normally biased by a suitable spring 21 acting between bushing 14 and a spring retaining collar 22 fastened by pin 23 to rod 15 to a normally open position of valve member 17 relative to valve seat 24.

It is to be observed that the body casting 11 embodies the parallel spaced apart legs 25 which project outwardly therefrom to support the body casting 11 from an end wall 27 having a mounting flange 26. Extending outwardly from the end wall 27 is a tubing L 28 having screw threads 29 on the outward end 30 thereof for connection to suitable tubing, the tubing leading to a calender roll, indicated diagrammatically at 50. The inward end 31 of the pipe 28 terminates at the valve seat 24 formed in the end wall 27 and facing the interior of the header. The entire structure of the pipe 28, end wall 27, connecting legs 25 and body casting 11, is of unitary nature being formed preferably of one metal casting.

The body casting 11 at its inward end 32 is covered by an end cap 33 retaining a flexible diaphragm 34 thereacross by means of suitable bolts 35. The diaphragm 34 and end cap 33 constitute an expansible chamber 36 wherein chamber 36 connects by way of the passages 38 and 39, the latter passing through a leg 25 and through the end wall 27, to an external fitting 40 adapted to be connected to a fluid pressure line controlled by a valve, indicated diagrammatically at 51. The driving plate 41 is fastened by pin 42 to the valve rod 15 and presses against the flexible diaphragm 34 due to the biasing action of spring 21. Upon a greater pressure being supplied through the fitting 40 and bores 39 and 38 to expansible chamber 36 the air in chamber 37 vents into the conduit or manifold 47 through opening 12a so that diaphragm 34 will be caused to move, urging the driving plate 41 and valve rod 15 in a direction for closure of the valve effected by engagement of the chamfered edge 43 of the seating rim 20 of valve member 17 with the valve seat 24. It will be obvious that between the fully open and fully closed positions of the valve, the position of the valve member is determined by the pressure in the expansible chamber 36 subject to the action of the biasing spring 21.

Preferably the contour of the surface 18 provides a straight line function of volume of flow through the valve in unit time for equal increments of valve movement for a clean gas.

In use, the valve of the invention is connected for fluid flow control by the mounting flange 26 thereof to nipple 45 by means of bolts 46, the nipple forming a part of the outer wall of the header 47. Thus the end wall 27 seals the opening defined by the nipple in the outer wall of the header. The header 47 serves as a conduit for air under pressure and the valve member 17 controls the flow of air by way of the outlet pipe 28 to a utilizing device 50 connected to the screw threads 29.

It will be noted that in a general sense, the valve seat 24 serves effectively as the inlet opening for the valve and that the bore 48 terminating at the valve seat 24 effectively constitutes the outlet opening. The legs 25 leave, between them and the walls 12, passages for flow of air from the interior of the header through the valve seat and the bore 48.

In a conventional valve, the inlet and outlet openings are formed in a valve body which surrounds the valve member. In the present valve structure, the valve member is not disposed between the inlet and outlet openings but rather the valve member including its operating structure and support therefor is disposed beyond the inlet opening. Therefore, in the valve construction of the invention, an inlet opening is provided by a valve seat in direct communication with the outlet opening on one side of the valve seat and the valve member and operative structure therefor are disposed on the other side of the valve seat past which inlet fluid must flow to the valve seat. By this arrangement of structure, the operative mechanism of the valve is adapted to be enclosed within a header by a mounting (at 26) near the inlet opening thereof whereby a space saving feature is afforded in many applications. Moreover, when the valve is employed for the handling of any clean fluid, the valve mechanism need be manufactured only for service within such fluid without regard to the effects of atmospheric dust, corrosive gases and the like.

What I claim as my invention is:

Apparatus for controllably regulating fluid flow comprising a header having an outer wall, the wall having an opening, and a valve mounted in the opening and extending into the header, the valve comprising an end wall having a fluid passage through the end wall, means securing the end wall to the outer wall of the header across said opening, a valve seat surrounding the passage at the side of the end wall facing the interior of the header, a pair of legs extending from the end wall into the header leaving a passage for flow of fluid from the interior of the header to said passage through the end wall, a chamber supported by the legs, a flexible diaphragm forming a wall of the chamber and subject at one side to the pressure within the chamber and at the opposite side to the fluid pressure within the header, a valve plug located adjacent the valve seat and cooperable therewith, a stem on the plug movable by the diaphragm for moving the plug towards the valve seat in response to increase of pressure in the chamber, one of the legs having a longitudinal passage from the interior of the chamber and extending through said end wall for remote control of the pressure in the chamber, a sleeve supported by the legs between the diaphragm and the plug, the stem being supported by and slidable in the sleeve for movement of the plug towards and away from the valve seat, and a spring bearing against the sleeve and normally biasing the stem and plug to a retracted position relative to the valve seat.

References Cited in the file of this patent

UNITED STATES PATENTS

| | | |
|---|---|---|
| 680,135 | Drew | Aug. 6, 1901 |
| 1,253,298 | Temple | Jan. 15, 1918 |
| 1,524,054 | Penfield | Jan. 27, 1925 |
| 1,737,933 | McCaddam | Dec. 3, 1929 |
| 1,786,195 | Dormoy | Dec. 23, 1930 |
| 2,249,576 | Payne | July 15, 1941 |
| 2,355,458 | Mastenbrook | Aug. 8, 1944 |
| 2,491,112 | Jansson | Dec. 13, 1949 |
| 2,559,692 | Whalen | July 10, 1951 |
| 2,672,086 | Jensen | Mar. 16, 1954 |